United States Patent
Wursthorn et al.

(10) Patent No.: US 6,191,907 B1
(45) Date of Patent: Feb. 20, 2001

(54) HEAD DRUM FOR A MAGNETIC TAPE RECORDER

(75) Inventors: Edgar Wursthorn, Bad Dürrheim; Jürgen Kaaden; Klaus Oldermann, both of Villingen-Schwenningen, all of (DE)

(73) Assignee: Deutsche Thomson-Brandt GmbH, Villingen-Schwenningen (DE)

( * ) Notice: Under 35 U.S.C. 154(b), the term of this patent shall be extended for 0 days.

(21) Appl. No.: 09/086,007

(22) Filed: May 27, 1998

(30) Foreign Application Priority Data

Jun. 2, 1997 (DE) .............................................. 197 23 009
Oct. 2, 1997 (DE) .............................................. 197 43 753

(51) Int. Cl.⁷ .................................................. G11B 15/14
(52) U.S. Cl. .............................. 360/64; 360/281; 360/272
(58) Field of Search ................................ 360/64, 66, 108, 360/21, 62, 281, 272, 67, 68

(56) References Cited

U.S. PATENT DOCUMENTS

| | | | |
|---|---|---|---|
| 4,605,974 | * | 8/1986 | Ochi et al. .............................. 360/62 |
| 4,926,273 | * | 5/1990 | Tabuchi et al. ......................... 360/64 |

OTHER PUBLICATIONS

JP Patent Abstracts of Japan: 5–46952, A,P–1567, Jul. 5, 1993, vol. 17, No. 354; 3–108116 A,P–1234, Aug. 5, 1991, vol. 15, No. 305; 3–252914, A,P–1309, Feb. 10, 1992, vol. 16, No. 53; JP 63–131302 A; JP 63–16000 A.
Copy of Search Report.

* cited by examiner

Primary Examiner—Alan T. Faber
(74) Attorney, Agent, or Firm—Joseph S. Tripoli; Joseph J. Kolodka

(57) ABSTRACT

A head drum for a magnetic tape apparatus includes a stationary lower cylinder and a rotating upper cylinder on which at least one write/read head is securely arranged and interacts with a magnetic tape with an exchange of electromagnetic signals. Also provided are at least one amplifier which rotates together with an upper cylinder and amplifies the signals coming from the write/read head, and a rotating transformer for transferring electrical signals between the stationary lower cylinder and the rotating upper cylinder. Storage means for electrical energy arranged on the rotating upper cylinder is capable of supplying electrical power to all the electronic components rotating together with the upper cylinder. A controller is securely arranged on the rotating upper cylinder for monitoring the charge state of the storage means and controlling the duration of the energy transfer as a function of the charge state.

12 Claims, 5 Drawing Sheets

Figure 1:
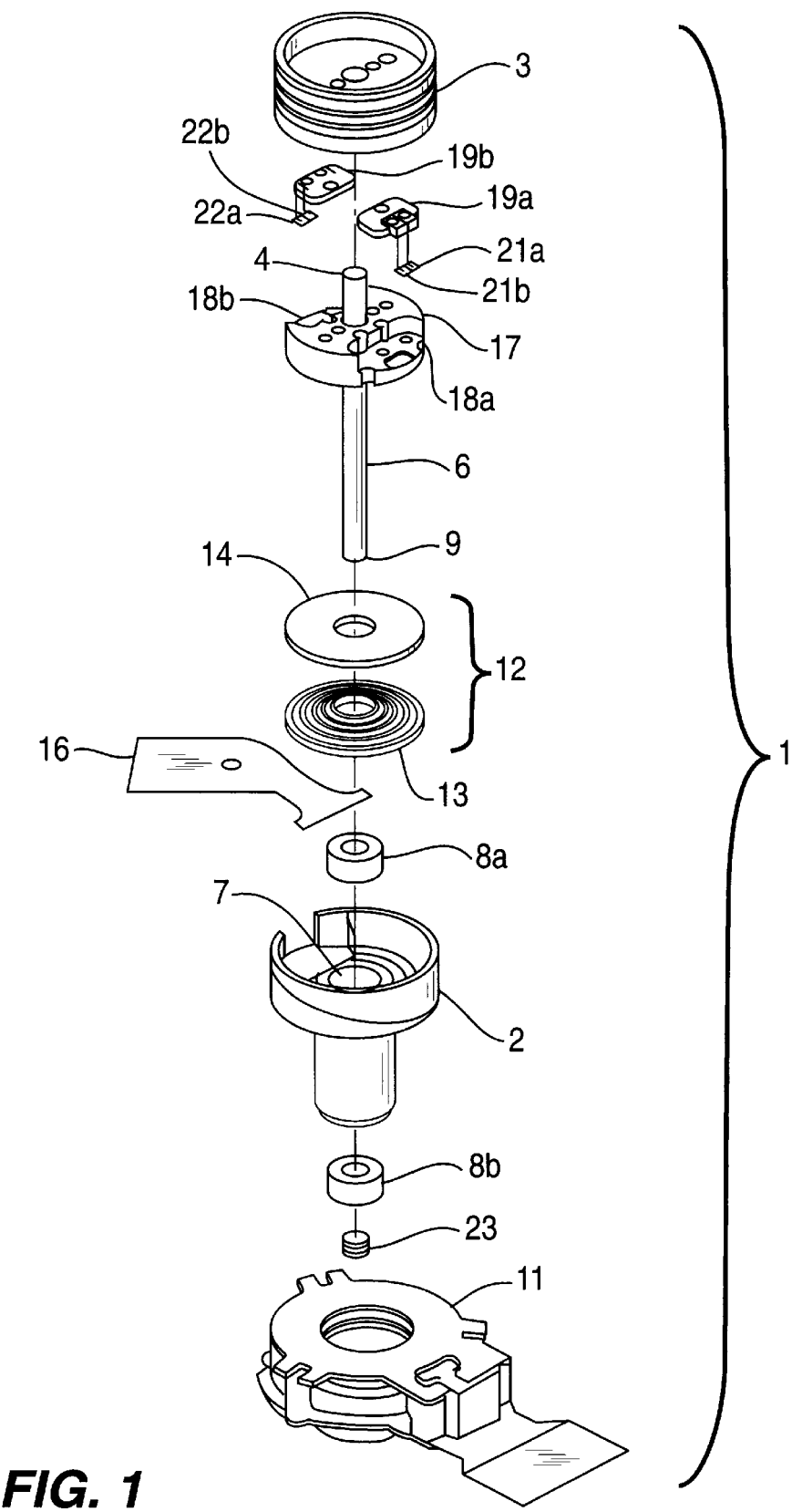

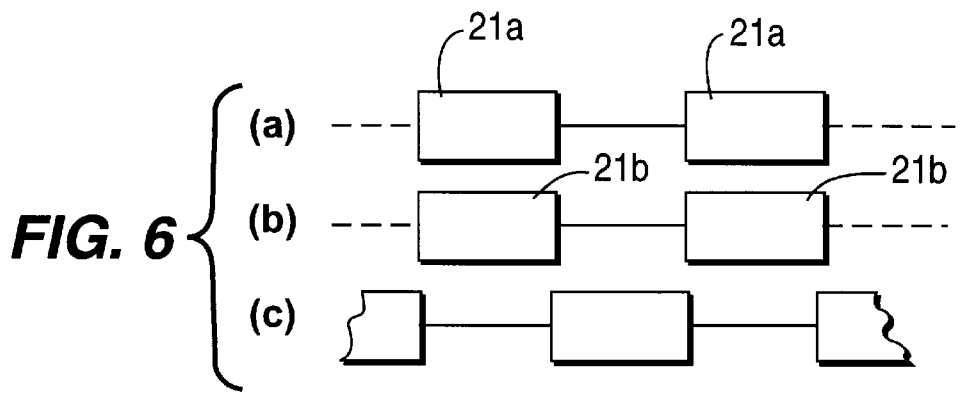
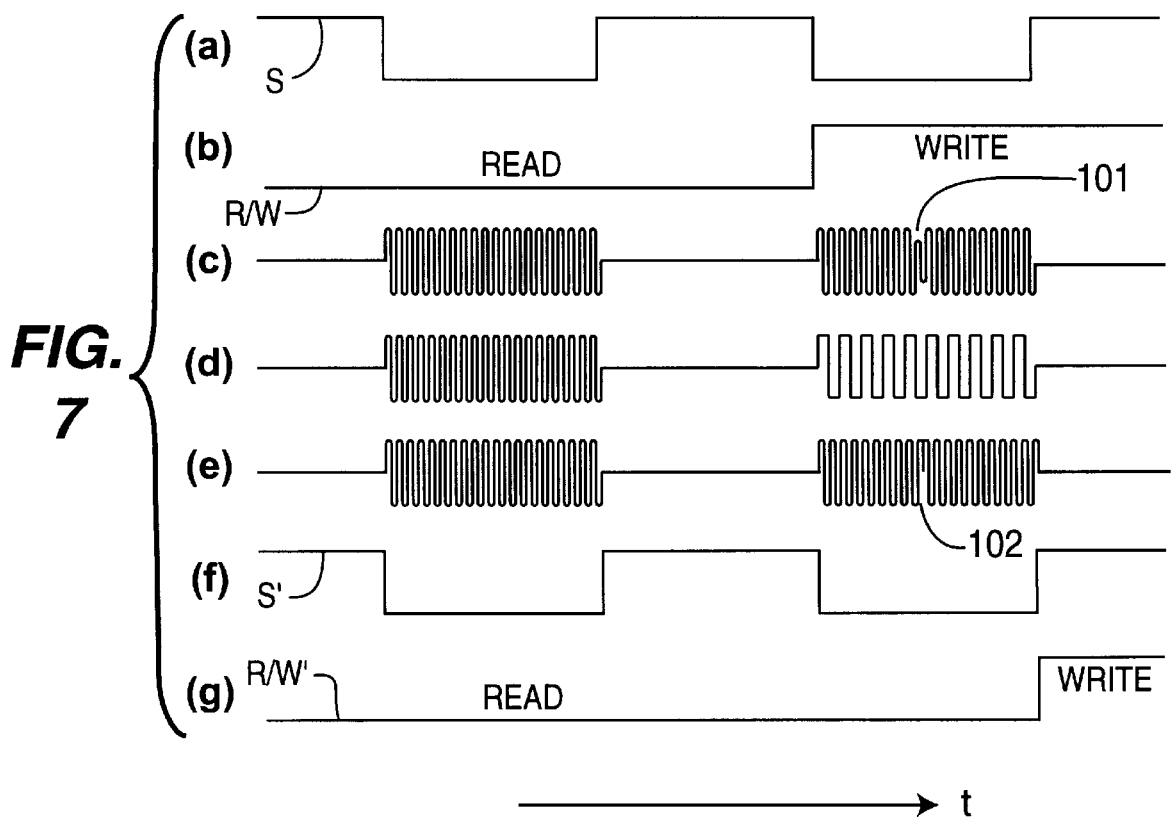

HEAD DRUM FOR A MAGNETIC TAPE RECORDER

The present invention relates to a head drum for magnetic tape apparatuses. In the following text, a magnetic tape apparatus should be understood as meaning any apparatus in which signals, data or information in analogue and/or digital form are recorded on a magnetic tape and/or read from the latter. Independently of this, these apparatuses may also have other functions, e.g. they may be combined with an electronic camera. The invention additionally relates to a method for writing and/or reading signals or data to or from a magnetic tape. Finally, the invention relates to a magnetic tape apparatus which is equipped with a head drum.

The prior art discloses a video recorder in which the amplifier for the head is arranged inside the head drum. This arrangement means that the path of the head signal read is shorter in comparison to those video recorders in which the amplifiers are located outside the head drum, with the result that interference, caused by electromagnetic fields, in the read signal is reduced. In apparatuses sold nowadays, the bandwidth of the recorded data can be managed well with such system.

In digital video systems, which have a higher recording density and therefore require a larger bandwidth, the passive systems described in the digital video systems, the recording density can be increased, on the one hand, by reducing the width of the tracks on the magnetic tape, and, on the other hand, by increasing the bit density inside the tracks. It is frequently not desirable to reduce the track widths, however, because, on the one hand, the mechanical complexity greatly increases with reducing tracks widths, and, on the other hand, the track widths have to be kept constant on account of the compatibility of different systems. If the bit density is increased, the write/read heads have to be designed for better signal-to-noise ratios at higher frequencies. Such a system is disclosed in the prior art. In the video recorder disclosed in that article, the head amplifiers rotate together with the heads, with the result that the signal path from the read head to the head amplifier is as short as possible, in order to reduce interference in the head signal, as a result of electromagnetic fields, even more. The greatest interference is produced by stray fields originating from the transformer which is used to transmit the signals and transfer the electrical power for the head amplifiers between the stationary lower cylinder and the rotating upper cylinder of the head drum. The head amplifiers typically require a few hundred milliwatts of power, whereas the unamplified head signal is about 200 $\mu$V, with the result that the stray fields lead to interference that cannot be ignored, particularly in the case of low to medium frequencies. In the context of the present invention, for example, frequencies up to 1 MHz are termed low frequencies, frequencies between 1 MHz and 3 MHz are termed medium frequencies, and frequencies between 4 MHz and 21 MHz are termed high frequencies.

Similar difficulties occur with all apparatuses which have been covered by the term "magnetic tape apparatuses" in the introduction.

On this basis, it is the object of the invention to reduce the influences of interference on the head signal further.

This object is achieved by a head drum which is characterised in that, on the rotating upper cylinder, storage means for electrical energy are arranged which are capable of supplying electrical power to all the electronic components rotating together with the upper cylinder, at least at times.

The storage means enable the head amplifiers to be supplied with power from the storage means during the time period in which the signal is being read by the at least one head. The power supply, which is switched off during the reading and/or writing of data, results in electromagnetic interference fields in the signal path of the heads being largely avoided.

In an advantageous embodiment of the invention, two write/read heads are arranged at different azimuth angles in the rotating upper cylinder of the head drum. This arrangement of the write/read heads allows the video tracks to be recorded next to one another on the magnetic tape without a guard band, whilst ensuring good crosstalk attenuation. A pair of amplifiers may be allocated to each write/read head, in each case one of the amplifiers amplifying the data which are read and the other amplifier amplifying the data which are written.

the head drum rotates, for example, at about 9000 revolutions/minute, so that the storage means are charged and discharged very frequently. Capacitors can therefore expediently, be provided as storage means. In addition, means for stabilizing the output voltage can also be provided on the rotating upper cylinder of the head drum in order to ensure that all the rotating electronic components operate correctly.

In one advantageous exemplary embodiment of the invention, a controller is arranged on the rotating upper cylinder, monitors the charge state of the storage capacitors and controls the energy transfer as a function of this. This ensures that only as much energy is transferred as is actually required by the rotating electronic components.

In order to make sure that the head drum runs with as few mechanical problems as possible, it is advantageous to arrange the components rotating together with the rotating upper cylinder such that their centre of gravity coincides essentially with the centre of the axis of rotation of the rotating upper cylinder.

A further object of the invention is to specify a method for writing and/or reading information on a magnetic tape, in which the influences of interference is a result of electromagnetic stray fields are largely avoided.

This object is achieved by a method according to Claim 8. One advantage of this method is that the reading and writing of information signals and the transfer of electrical power between the bottom and the upper cylinder of the head drum occur successively in time, with the result that the influences of interference, from electromagnetic stray fields, on the signals from the write/read heads are largely avoided. The time periods can be chosen such that, together, they correspond approximately to the rotation time of the rotating upper cylinder of the head drum. The time periods can also be subdivided into a number of time intervals which are separated from one another in time. For example, during each half-revolution of the head drum, power can be transferred and data can be transmitted. This has the advantage that the method according to the invention can also be applied to head drums having more than one pair of heads. Finally, the method can also be performed in such a way that the first and the second time period in each case take place during various revolutions of the head drum.

Advantageously, the second time period can be regulated such that just as much energy is transferred into the storage means as is actually required by the electronic components rotating with the rotating upper cylinder of the head drum. This method has the advantage that particularly low energy consumption is achieved, which is very important for battery-operated apparatuses.

Changing over between energy transfer and data transmission can advantageously be achieved by means of a changeover signal and a selection signal, which are transmitted together with the energy signal.

According to one refinement of the invention, a data word can initially be produced for this purpose from the changeover signal and the selection signal as well, and the said data word is transmitted, in order to perform the necessary control functions, to a control circuit which rotates with the rotating cylinder of the head drum.

A final object of the invention is to provide a magnetic tape apparatus which has an improved signal-to-noise ratio. The magnetic tape apparatus can be an apparatus from the field of consumer electronics or from professional electronics, such as video recorders, camcorders or data storage devices. In particular, such data storage devices can also be used in computer systems.

This object is achieved by a magnetic tape apparatus according to Claim 15.

Figure 2:
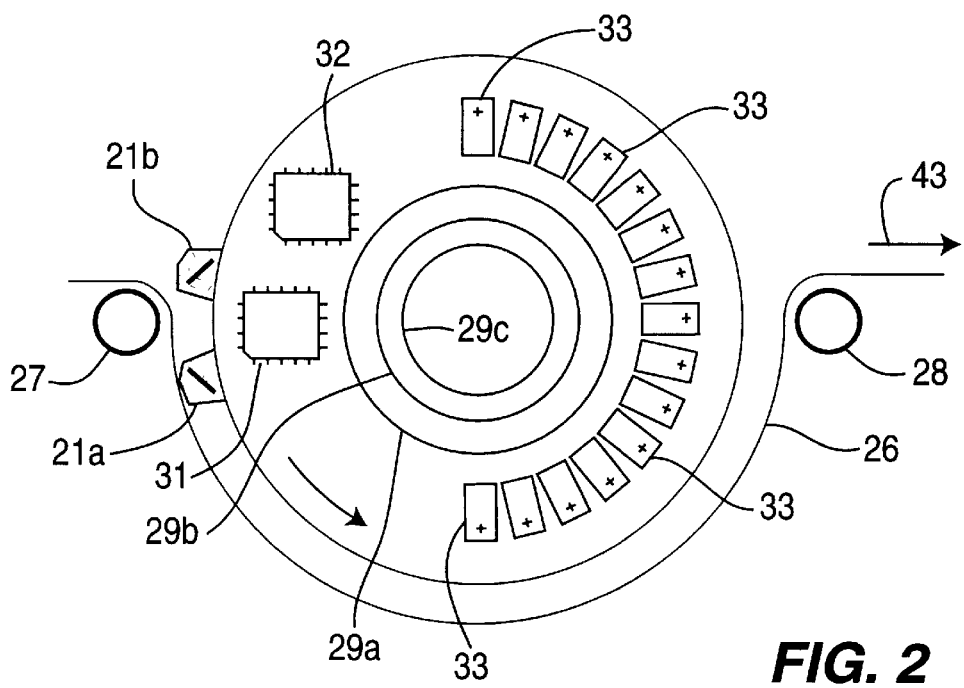
Figure 3:
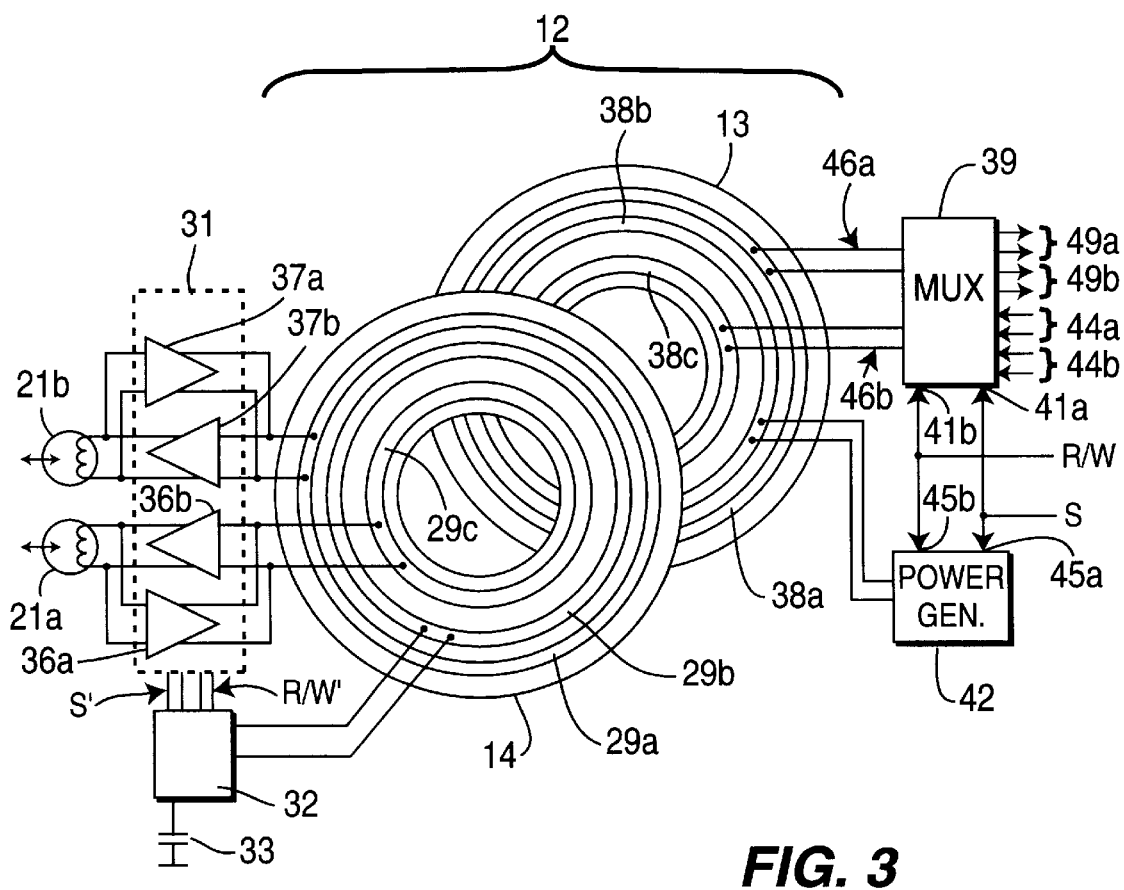
Figure 4:
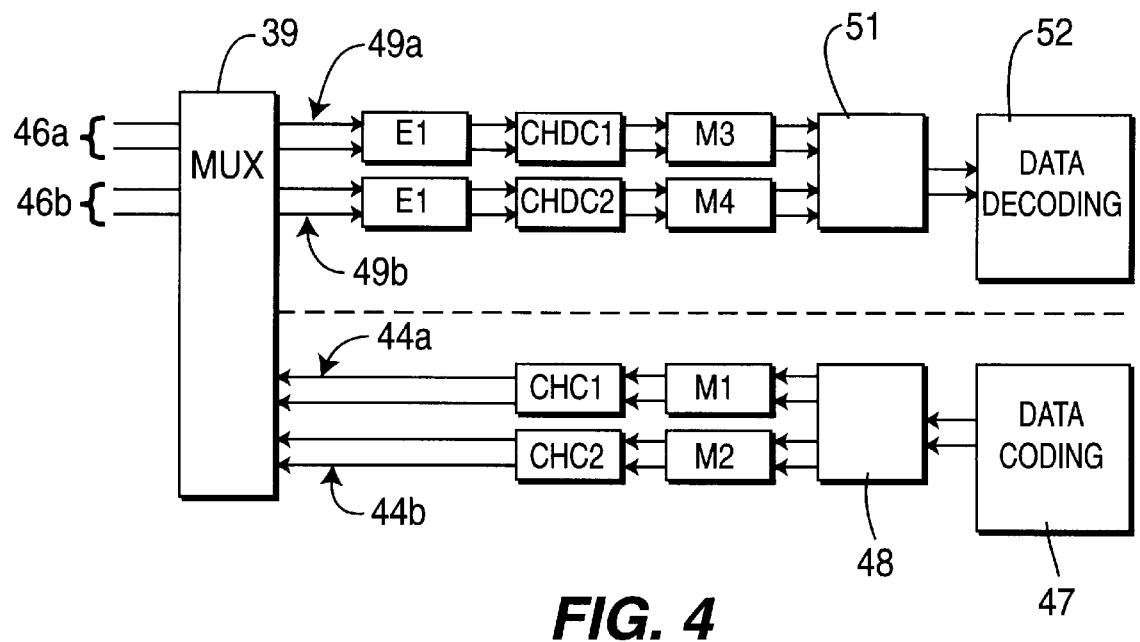
Figure 5A:
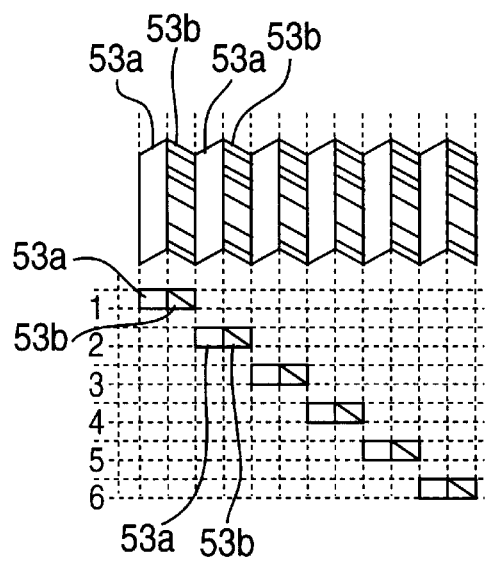
Figure 5B:
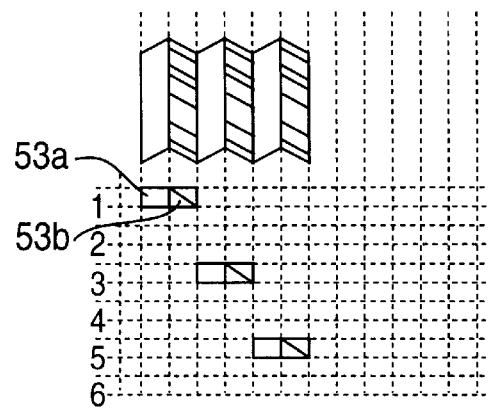
Figure 8:
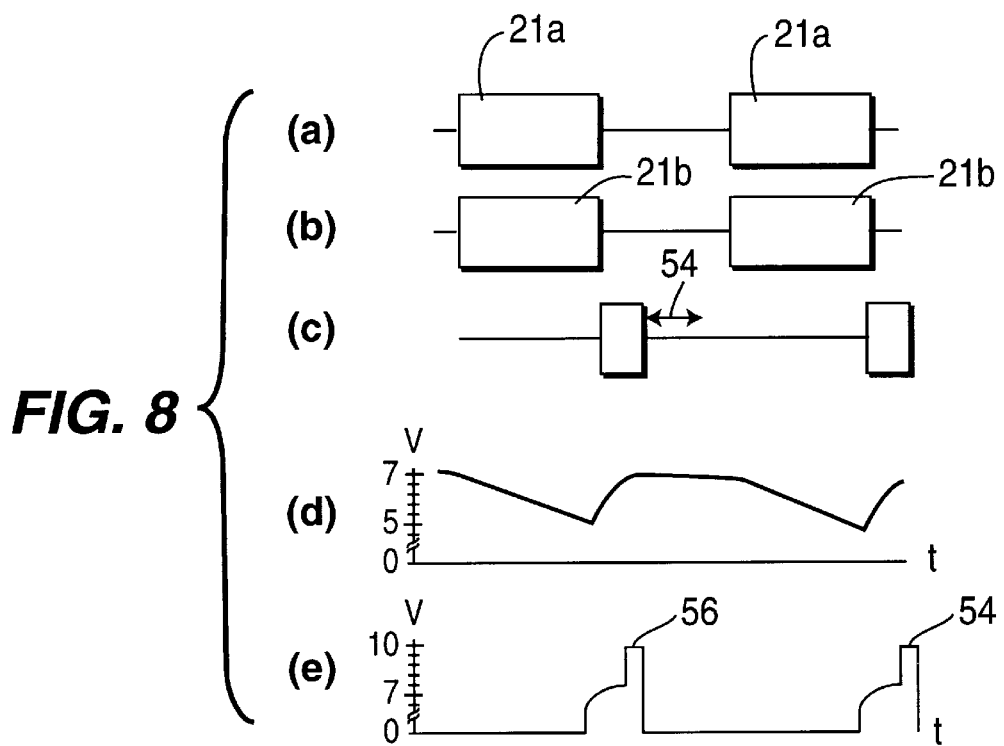

Exemplary embodiments of the head drum according to the invention are illustrated in the drawing, in which:

FIG. 1 shows a perspective exploded illustration of a head drum according to the invention, FIG. 2 shows a schematic illustration of a second exemplary embodiment of the head drum according to the invention, FIG. 3 shows a schematic illustration of how the transformer interacts with the electronic components, FIG. 4 shows a block diagram of the signal path when data are being read and written, FIG. 5a shows a schematic illustration of the position of the tracks and the time sequence of writing or reading, FIG. 5b shows an illustration corresponding to FIG. 5a with a reduced data rate, FIGS. 6a to 6c show the time sequence of read or writing data and of energy transfer, FIGS. 7a to 7g show the time structure of the changeover signal, the selection signal and the energy signal for one embodiment of the invention, FIGS. 8a to 8c show the time sequence of reading and writing data and of energy transfer corresponding to FIGS. 6a to 6c, FIG. 8d shows the waveform of the secondary voltage of the transformer, FIG. 8e shows the waveform of the primary voltage of the transformer, and FIGS. 9a and 9g show the time structure of the changeover signal, the selection signal and the energy signal for another embodiment of the invention.

FIG. 1 shows the structure of the head drum 1 according to the invention in a perspective exploded illustration. The head drum, denoted by 1 overall, connected to a chassis (not shown) of a video recorder. In addition, the head drum 1 has a rotating upper cylinder 3 which is connected, to the top end 4 of a drive shaft 6 such that they rotate together. The diameter of the two cylinders 2, 3 is 21.6 mm, for example. The drive shaft 6 is mounted such that it can rotate without play in a passage 7 in the lower cylinder 2, by means of two ball bearings 8a, 8b supported in the latter. The lower end 9 of the drive shaft 6 is connected to a drive motor 11 which causes the upper cylinder 3 to rotate when the video recorder is operating. Between the lower and the upper cylinder 2, 3 of the head drum 1, a two-part transformer 12 is arranged, whose bottom half 13 is connected to the lower cylinder 2 whilst the top half 14 rotates with the upper cylinder 3. A transformer board 16 is connected to the bottom half 13 and is used to make electrical connections from the head drum to the outside.

In addition, a flywheel 17 is arranged on the drive shaft 6 such that they rotate together, and is located between the lower cylinder 2 and the upper cylinder when the head drum 1 is assembled. The flywheel 17 has two recesses 18a, 18b which are diametrically opposite one another. Each recess 18a, 18b is designed to hold one head plate 19a, 19b in each case. Each head plate 19a, 19b bears one pair of write/read heads 21a, 21b and 22a, 22b in each case, the heads of each individual pair being arranged at different azimuth angles. The azimuth angles of in each case two heads 21b, 22b and 21a, 22a which are opposite one another are identical, with the result that the pairs of heads can write identical tracks in pairs on the magnetic tape. All the heads are adjusted such that they project 10–50 µm beyond the outer circumference of the upper cylinder 3. In addition, an amplifier board, which is not illustrated for reasons of clarity, is arranged on the flywheel 17 and bears head amplifiers and other electronic components which are described further below.

The mechanical arrangement of the head drum 1 with its drive 11 is supplemented by a compression spring 23 which ensures that the ball bearings are prestressed.

In the present exemplary embodiment, the lower and the upper cylinder 2, 3 are designed as hollow cylinders in places, so that the flywheel 17 and the transformer 12 can be held in the resulting cavity when the head drum 1 is assembled.

In another exemplary embodiment, the upper cylinder is designed to be so solid that the flywheel 17 is superfluous and is therefore omitted. In this case, the head plates 19a, 19b are correspondingly arranged directly on the upper cylinder 3 in which the drive shaft 6 is fixed.

The head drum illustrated schematically in FIG. 2 in a plan view from above differs from the one shown in FIG. 1 in that only one pair of write/read heads 21a, 21b is provided, and they actually project by 20–50 µm beyond the outer circumference of the head drum. A magnetic tape 26 partially encircles the had drum 1 and is in this case guided by means of guide or tape guide rollers 27, 29. Of the top half 14 of the transformer 12, this illustration shows only three windings 29a . . . 29c, arranged concentrically with the centre of rotation of the upper cylinder 3. Each half 13, 14 of the transformer 12 has a ferrite core (not shown) having three annular grooves.

an amplifier circuit 31 for the heads 21a, 21b and a switching circuit 32 are arranged adjacent to the heads 21a, 21b, the switching circuit controlling the transfer of energy between the rotating upper cylinder 3 and the stationary lower cylinder 2 of the head drum 1. A number of capacitors 33 acting as energy stores are opposite these two switching circuits 31, 32.

The spatially close arrangement of the heads 21a, 21b has the advantage that mechanical tolerances or a side impact on the bearings 8a, 8b have less of an influence on the recording and playback quality. This is because any mechanical inaccuracy in the head drum mounting has a virtually identical effect on the guidance of the heads, so that, for example, mutual overwriting of the tracks written by the heads is virtually ruled out. The same applies, in the appropriate sense, to playback of tapes which were recorded on this apparatus. Mechanical tolerances may possibly have an effect when magnetic tapes are written on one apparatus and played back on another.

All of the components rotating with the rotating upper cylinder 3 are arranged such that their common centre of gravity coincides essentially with the axis of rotation of the upper cylinder 3. If the centre of gravity should deviate from the exact central position, this can be rectified by means of a bore in or a balance weight on the flywheel 17 or the upper cylinder 3.

FIG. 3 shows a schematic illustration of the transformer 12 of the head drum from FIG. 2 and the connected electronic components. A pair of amplifiers 36a, 36b and 37a, 37b, respectively, is allocated to each write/read head 21a, 21b. The amplifier 36a is used to amplify signals which are read from the magnetic tape 26 by the head 21a, whilst the amplifier 36b is used as a driver for the head 21a when writing data to the magnetic tape. The same applies to the two amplifiers 37a, 37b which are allocated to the head 21b. For this purpose, the pairs of amplifiers are electrically connected to in each case one of the windings 29a and 29c of the transformer.

The signals are preferably digital signals and data. However, the invention can also be used when analogue data are present and, in principle, is not dependent on the type of data.

The control circuit 32 controls the charging of the storage capacitors, which are indicated schematically in this figure at 33, the power transfer to the amplifiers and the changeover of the amplifiers, so that, of the four amplifiers 36a, 36b; 37a, 37b, only two are ever active, the selection depending on whether data are being written or read. If the two heads 21a, 21b are not in contact with the magnetic tape 26, all the amplifiers are switched off in this embodiment of the invention. The method of operation is described in even more detail further below. The control circuit 32 is connected to the middle winding 29b of the transformer 12, to the storage capacitors 33 and to the amplifiers. The control circuit 32 also comprises a voltage regulator which ensures that a constant operating voltage is always present at the amplifier circuit 31.

The bottom half 13 of the transformer 12 has three windings 38a . . . 38c. The windings 38a, 38c are connected to a multiplexer 39 which makes the connections to the individual heads 21a, 21b. A primary changeover signal S and a primary selection signal R/W are applied to control inputs 41a, 41b of the multiplexer 39, these signals in each case being able to assume two different states, e.g. "High" and "Low". Depending on the combination of the states of the two signals, the multiplexer 39 connects the corresponding channels. For example, the "High" state of the changeover signal S can mean that signals are being transmitted, and the "Low" state can mean that power is being transferred. The "High" state of the selection signal R/W indicates that signals are intended to be written, whilst "Low" specifies the reading of signals. The details are described further below in the description of operation.

The data to be written are fed to the multiplexer 39 on two input channels 44a, 44b. The multiplexer 39 emits the data via two channels 46a, 46b which are electrically connected to the inner and outer winding 38a, 38c, respectively, of the bottom transformer half 13. The windings 38a, 38c are inductively coupled to the windings 29a, 29c on the top transformer half 14, which, for their part, are connected to the drivers 36b and 37b, respectively. The drivers 36b, 37b amplify the signals coming from to the heads 21a and 21b, respectively, and feed them to the heads 21a and 21b, respectively. The multiplexer 39 additionally has two outputs 49a, 49b at which the data read are emitted. Just like the inputs 44a, 44b, the outputs 49a, 49b are connected to the heads 21a, 21b via the transformer 12 and the amplifiers circuit 31.

Finally, a generator circuit 42 is provided for supplying the primary winding 38b of the bottom transformer half 13 with electrical power and is connected to the winding 38b. The generator circuit 42 has an input 45a into which the primary changeover signal S is likewise input. The "High" state of the changeover signal S switches the generator circuit 42 on, whilst the "Low" state of the signal S switches it off. The generator circuit 42 emits short square-wave pulses at an switching frequency of approximately 200 kHz. The square-wave pulses produce an induction voltage in the winding 29b of the top transformer half 14, which voltage is used to charge the storage capacitors, it being possible for the peak voltage of the pulses to be 10 v, for example. Instead of the square-wave pulses, it is also possible to apply another voltage varying with time to the primary winding of the transformer. In the following text, the signal emitted by the generator circuit in order to supply power is called an power signal for the sake of simplicity.

The primary selection signal R/W is input into an input 45b. The respective state of the selection signal R/W is impressed on the power signal in a suitable manner which is described further below.

The information regarding whether the heads are intended to be active or inactive and whether data are intended to be read or written must be transmitted to the amplifier electronics rotating with the top transformer half. For this purpose, the evaluation electronics 32 produce a secondary changeover signal S' and R/W' influence the amplifier circuit 31 in a way corresponding to how the primary signals S and R/W control the multiplexer 39.

FIG. 4 illustrates the path of the data signals in greater detail. As they come from a data coding unit, the data are passed to an error correction state and, 47, the data enter an error correction stage 48 and, from there, to data stores M1 and M2. Next, the data pass through two channel coding stages CHC1, CHC2 and finally arrive at the inputs 44a, 44b of the multiplexer 39.

The outputs 49a, 49b of the multiplexer 39 are connected to two equalizers E1, E2, two channel decoding stages CHDC1, CHDC2 and two data stores M3, M4. The data stores are connected to a further error correction stage 51, which is additionally connected to a data decoding unit 52 where the data read are decrypted.

The method of operation of the head drum 1 described thus far when operating in a video recorder is now described using FIGS. 5 and 6:

During recording, i.e. when writing data or signals to the magnetic tape 26, the tape encircles the head drum 1 through approximately 180°, as shown schematically in FIG. 2, and is moved on in the direction of the arrow 43 by a tape drive (not shown). In this case, the head drum 1 rotates anticlockwise at a rotational speed of approximately 9000 rpm. The two heads 21a, 21b write tracks 53a, 53b (FIG. 5) approximately 10 µm wide on the magnetic tape 26, the position of these tracks being schematically illustrated in the top area of FIG. 5a. The tracks are written by the two heads at different azimuth angles and are adjacent to one another without a guard band, i.e. without any separation. The different orientation of the magnetization of the two tracks means that good crosstalk attenuation is achieved if the heads 21a, 21b do not scan the correct tracks exactly. For a magnetic track at with the "wrong" azimuth angle, the playback signal of the heads is significantly smaller, at medium to high frequencies, than in the case of a magnetic track at the "correct" azimuth angle. It is therefore possible to dispense with any separation between the individual tracks—a guard band. This system makes it possible to achieve a recording rate of 25 Mbit/s, for example.

As can be seen particularly from FIG. 2, the two heads 21a, 21b engage almost simultaneously with the magnetic tape 26 and in each case write a track at the same time.

In the bottom area of FIG. 5a, the position of the tracks 53a, 53b is additionally shown as a function of time. In this illustration, the position of the next track in each case is shifted in the transport direction of the magnetic tape by the width of the previously written one, time passing from top to bottom. The numbers at the left-hand edge of the illustration continuously count the revolutions of the head drum 1. It can clearly be seen that, during the first half of each revolution, the two magnetic tracks are being written, whereas, during the second half of each revolution, the heads are no longer in contact with the magnetic tape 26 and are therefore inactive. The changeover signal S ensures that the alternation between these two states occurs at the correct instant.

FIG. 5b shows a corresponding illustration for a mode of operation at a reduced data rate, in which no data at all are transmitted during every alternate revolution of the head drum. The transport speed of the magnetic tape is adapted to this, so that, in this case too, the magnetic tracks are adjacent to one another without an interspace, as can be seen in the top part of FIG. 5b. In one exemplary embodiment of the invention, the tape transport speed is 9 mm/s in the mode of operation at a reduced data rate of 12.5 Mbit/s, for example.

The servo system for the magnetic tape transport is controlled on the basis of software-assisted control programs, which inherently permit a high level of flexibility, so that other modes of operation can also be implemented without any major circuitry complexity. For example, the magnetic tape can also be moved on in steps in order to implement energy-saving modes of operation at a particularly low data rate.

Before the heads 21a, 21b disengage from the magnetic tape 26, data transmission is finished off and, once data transmission has ended, a power transfer is initiated. The time sequence of these processes is shown in FIG. 6, the shaded boxes illustrating activity and a single line illustrating inactivity of the respective components.

As can be seen from FIGS. 6a and 6b, the two heads 21a, 21b are simultaneously active during a first time period. This is followed by a second time period, during which the heads are inactive. The power transfer takes place during this time period, i.e. The activity of the heads 21a, 21b and the power transfer are in antiphase to one another. The magnetic tape 26 is moved on continuously, however, the width of the magnetic tracks, the revolution speed of the head drum and the transport speed of the magnetic tape being matched to one another in such a way that, during the power transfer, the magnetic tape is transported further by such a distance that the tracks written next adjoin the tracks 53a, 53b written previously without an interspace.

The time structure of the sequences when reading data from the magnetic tape is no different. However, when reading data, the amplifiers 36a, 37a are used instead of the amplifiers 36b, 37b.

As a result of operating the signal transmission and the power transfer in the time-division multiplex mode, mutual interference between these signals is ruled out from the magnetic tape 26. For this reason, there is no need to place any straight requirements on the mechanical precision of the transformer 12, which is crucial for stray fields, and this has a favourable effect on the production costs of the head drum according to the invention.

Mutual influence is possible only between signal paths associated with the two heads 21a, 21b. In the present exemplary embodiment of the invention, the inner and the outer windings 29a, 38a and 29c, 38c, which are physically separated from one another by the greatest amount, are therefore used for signal transmission. In addition, the primary winding 38b of the bottom transformer half 13 is connected, with low impedance, to a common potential by means of the generator circuit 42. This produces good electromagnetic isolation between the signal parts.

Just like the energy signal, the changeover signal S and the selection signal R/W are also transmitted via the middle windings 29b, 38b of the transformer 12, thus avoiding interference resulting from these signals in the data to be written or to be read.

The time sequence of the changeover signals S and S', the selection signals R/W and R/W' and the power signal is illustrated graphically in FIG. 7.

The changeover between writing and reading is controlled by the selection signal R/W, which is fed to the multiplexer 39 and the generator circuit 42. In the method of operation illustrated using FIG. 6, switching-on and switching-off of the power transfer is performed by the changeover signal S (FIG. 7a). In the simplest case, the evaluation circuit 32 evaluates the induction voltage produced in the secondary winding 29b as a result of switching-on and switching-off the power signal and produces a corresponding secondary changeover signal S' (FIG. 7f) which is used to activate or deactivate the amplifier circuit 31.

If the selection signal R/W changes its state from "High" to "Low" or vice versa, this change of state of the selection signal R/W (FIG. 7b) in the generator circuit 42 initiates a brief amplitude change 101 in the power signal emitted to the primary winding 38b (FIG. 7c). This amplitude change is detected by a threshold value detector inside the evaluation circuit 32. As soon as power transfer has ended, i.e. when the signals S and S' change from "Low" to "High", the evaluation circuit 32 produces the secondary selection signal R/W' (FIG. 7g) and feeds it to the amplifier circuit 31 (FIG. 3). The signal R/W' thus controls the selection of the read amplifiers 36a, 37a and write amplifiers 36b, 37b.

In modified embodiments of the invention, instead of changing the amplitude change of the square-wave pulses, the selection signal R/W can also effect a change in the pulse repetition frequency (FIG. 7d) or a phase jump 102 (FIG. 7e) in the power signal. These changes are evaluated by a frequency discriminator arranged in the evaluation circuit 32, or a phase discriminator with an associated threshold value detector. On the basis of this evaluation, the signal R/W' is emitted to the amplifier circuit 31 as soon as the energy transfer has ended. As a result, the corresponding read and write amplifiers are once again selected.

In the present exemplary embodiment, a maximum of one time period is available for the energy transfer, this time period corresponding to half the duration of one revolution of the head drum. During this time period, it is usually possible to transfer more energy than is actually required by the electronic components in the upper cylinder of the head drum.

Hence, further exemplary embodiment, provides that the controller 32 matches the time period during which energy is transferred to the actual energy requirement. The method of operation of this exemplary embodiment is illustrated in FIGS. 8a to 8f.

FIG. 8a and FIG. 8b show, in a manner corresponding to FIG. 6a and FIG. 6b, activity and inactivity of the two heads 21a, 21b. In this exemplary embodiment, however, the time period during which energy is actually transferred is shorter than half the time of one revolution of the head drum, as can be seen in FIG. 8c. The energy transfer can be shifted in time in the period in which the heads are inactive, as indicated by the arrow 54.

The control circuit 32 monitors the charge voltage of the capacitors 33. If a specific preset limit voltage of, for example, 7 V is reached, the control circuit 32 interrupts the electrical connection to the capacitors 33. As a result of the change of load thus effected, a voltage spike 54 occurs on the winding 38b on the primary side (FIG. 8e), which switches off the generator 42.

FIG. 8d plots the waveform of the secondary voltage of the transformer 12 with respect to time. It can clearly be seen that this voltage reaches the minimum at the end of the activity of the heads, when the storage capacitors 33 are discharged to the greatest extent.

FIG. 8e plots the primary voltage of the transformer 12, which voltage is zero during the activity of the heads. Not until energy is transferred does the primary voltage jump to an initial value and rise slowly as the secondary voltage increases, i.e. as the storage capacitors 33 receive more charge. When the secondary voltage reaches the limit voltage, the control circuit 32 disconnects the storage capacitors 33 from the charging current. As a result of this change of load mentioned above, a voltage spike occurs in the primary voltage, which switches off the generator 42. The secondary voltage remains constant until the heads become active again and require power. After the activity of the heads has ended, this cycle begins again. This means that the energy consumption of the arrangement is minimized, which is of particular importance for battery-operated apparatuses.

The selection of the head amplifiers by means of the selection signal R/W does not change with this method. In this case too, a secondary selection signal R/W' is produced after the end of energy transfer. The only difference from the exemplary embodiment described in the introduction is that the head amplifiers are now switched on for a certain time period before data are written or read. However, apart from a slight increase in energy consumption, this has no further negative effects because, at this instant, the heads 21a, 21b are still not in contact with the magnetic tape 26.

In yet another exemplary embodiment of the invention, although the changeover signal s and the selection signal R/W are fed to the generator circuit 42, they are not transmitted directly. Instead, a digital word, having a length of 8 bits, for example, is produced in the generator circuit 42 depending on the state of the signals S and R/W, which word is impressed, when the supply of power starts, on the power supply signal, which functions as a carrier.

Figure 9:
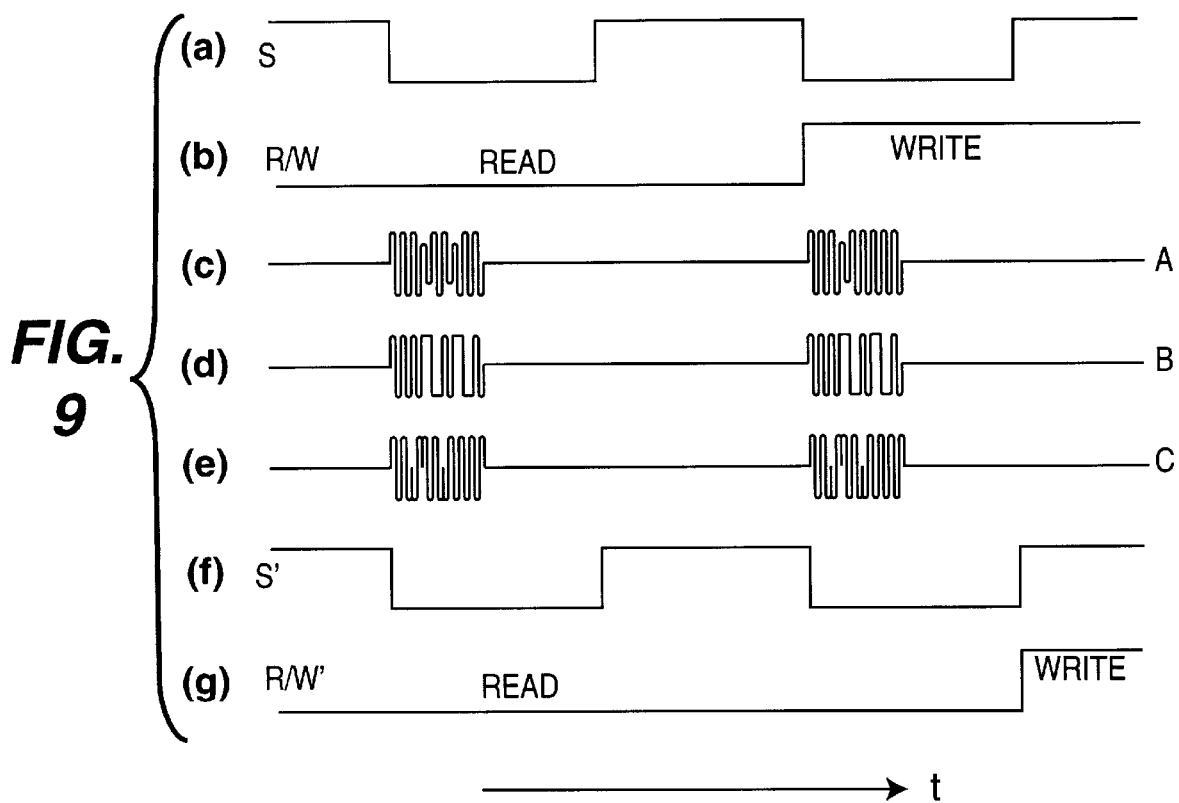

FIG. 9 illustrates the relationships between these signals and their waveforms. The data word can optionally be impressed using amplitude—(FIG. 9c), frequency—(FIG. 9d) or phase-modulation (FIG. 9e). The digital signal, which is transmitted together with the power signals S' and R/W' in the control circuit 32 using suitable means. For this purpose, the control circuit 32 has a delay stage, for example a down-counter, whose start value is transmitted in 6 bits of the data word. Starting from this start value, the counter counts down as a function of time. The clock oscillator, which is necessary for the counter to count down and whose nominal frequency is adjustable, is contained in the control circuit 32. When the counter arrives at a count of zero, the changeover signal S' is produced, which changes the amplifier circuit 31 over to the active state. In this way, premature activation of the heads is avoided.

Changing over to the active state occurs, as in the above exemplary embodiments described, at the same time that the power supply is switched on.

One of the remaining two bits of the 8-bit-long data word transmitted uses the selection signal R/W' to control the selection of the read and playback amplifiers 36a, 37a and 36b, 37b. In a head drum having two pairs of heads, the remaining bit of the 8-bit-long data word can be used to produce a selection signal for the second pair of heads.

The exemplary embodiment of the invention shown in FIG. 1 has two pairs of heads which are opposite one another. In order for time-division multiplex operation to be implemented between signal transmission and energy transfer, the encirculation of the head drum by the magnetic tape is chosen to be less than 180°, e.g. 174°. The difference of 6° from 180° is therefore available for the energy transfer. This means that the time period is available for the energy transfer twice per revolution of the head drum, this time period being required by the head drum in order to rotate through a further 6° at a nominal rotational speed. The operational sequences described above remain essentially unchanged in this embodiment as well.

One advantage of this arrangement is that the doubled number of heads increases the maximum data rate to 50 Mbit/s. However, it is necessary to have a selection signal R/W for each pair of heads, if the write/read function is selected by a digital word.

What is claimed is:

1. Head drum for a magnetic tape apparatus, comprising a stationary lower cylinder and a rotating upper cylinder on which at least one write/read head is securely arranged and interacts with a magnetic tape with the exchange of electromagnetic signals, at lease one amplifier being provided which rotates together with the upper cylinder and amplifies the signals coming from the write/read head, a rotating transformer for transferring electrical signals between the stationary lower cylinder and the rotating upper cylinder, storage means for electrical energy arranged on the rotating upper cylinder, the storage means being capable of supplying electrical power to all the electronic components rotating together with the upper cylinder, at leas at times, and a controller securely arranged on the rotating upper cylinder, the controller monitoring the charge state of the storage means and controlling the duration of the energy transfer as a function of the charge state.

2. Head drum according to claim 1, wherein on the rotating upper cylinder, two write/read heads are securely arranged which are offset with respect to one another by a specific angle of rotation and are at different azimuth angles.

3. Head drum according to claim 1, further comprising a pair of amplifiers associated with each write/read head.

4. Head drum according to claim 3, wherein the pair of amplifiers comprises one amplifier for amplifying signals received from the write/read head and one driving amplifier for outputting signals to the write/read head.

5. Head drum according to claim 1, wherein the components rotating together with the rotating upper cylinder are arranged such that their centre of gravity coincides essentially with the centre of the axis of rotation of the rotating upper cylinder.

6. Method of writing and/or reading information to or from a magnetic tape using a head drum according to claim 1, the method comprising the steps of:
   (a) writing or reading information during a first time period;
   (b) transferring energy for the electronic components rotating with the rotating upper cylinder of the head drum during a second time period which does not overlap the first time period; and
   (c) regulating the duration of the second time period with the controller in such a manner that, during the second time period, just as much energy is transferred into the storage means as is required by the electronic components rotating with the rotating upper cylinder of the head drum.

7. Method according to claim 6, wherein the first and/or the second time period are/is subdivided into a number of time intervals which are separated from one another in time.

8. Method according to claim 6, wherein the first and the second time intervals take place in each case during various revolutions of the head drum.

9. Method according to claim 6, further comprising the step of transmitting a changeover signal and a selection signal to an evaluation circuit which rotates with the upper cylinder of the head drum and produces control signals in order to control the writing and/or reading of information to or from the magnetic tape.

10. Method according to claim 6, characterized in that a regulator (32) regulates the duration of the second time period in such a manner that, during the second time period, just as much energy is transferred into the storage means (33) as is required by the electronic components rotating with the rotating upper cylinder (3) of the head drum (1).

11. Method according to claim 6, further comprising the step of using a changeover signal and a selection signal for producing a digital data word which is transmitted to an evaluation circuit rotating with the upper cylinder of the head drum, and in that the evaluation circuit produces control signals in order to control the writing and/or the reading of information to or from the magnetic tape.

12. Magnetic tape apparatus which is equipped with a head drum according to claim 1.

* * * * *